Nov. 20, 1962 C. D. HENRICH 3,064,656
HYDRAULIC LIFT FOR CORN SHELLER FEEDER
Filed July 25, 1960 2 Sheets-Sheet 1

Charles D. Henrich
INVENTOR.

BY
Attorneys

Nov. 20, 1962 C. D. HENRICH 3,064,656
HYDRAULIC LIFT FOR CORN SHELLER FEEDER
Filed July 25, 1960 2 Sheets-Sheet 2

Charles D. Henrich
INVENTOR.

BY *Clarence A. O'Brien
and Harvey B. Jacobson*
Attorneys

_United States Patent Office_

3,064,656
Patented Nov. 20, 1962

3,064,656
HYDRAULIC LIFT FOR CORN SHELLER FEEDER
Charles D. Henrich, Rural Route, Newell, Iowa
Filed July 25, 1960, Ser. No. 45,078
2 Claims. (Cl. 130—6)

The present invention relates to means, broadly speaking, for positively raising and lowering the hopper-equipped feeder of a corn sheller, for example, models 1200 D and E currently marketed by Minneapolis-Moline. On these and similar models it is necessary to lift the feeder to a suitably elevated position when the machine is transported from place to place.

The factory-design feeder rests on the ground when shelling and is mechanically raised to an elevated or transporting position by a hand-operated cable windlass provided with a self-locking ratchet and carrier bracket. More specifically, two frame sections, which go to make up the sectional frame, are respectively pivoted at outer ends thereof to the machine on the one hand and the underneath lower portion of the feeder on the other hand. These sections are telescopically connected so that they may be extended and retracted. This step is accomplished by a steel cable operating through a series of pulleys as a hand crank is turned either to raise or lower the feeder. The frame sections embody suitably arranged angle irons or interconnected bars. The frame section which is connected to the machine is slightly wider than the section which is hinged or connected to the feeder.

An object in the instant concept is to dispense with the crank-operated cable-controlled means and to save labor and valuable time and money by substituting therefor a so-called power lift, that is, one which is characterized by a simple and practical hydraulic jack which, in turn, is made up principally of a hydraulic cylinder with a hydraulic fluid feeding line attached to one end and which may be remote controlled from the driver's seat, air relief means being provided at the other end and said last-named end serving to accommodate the extensible and retractible rod of the reciprocable piston. With this arrangement the respective ends of the hydraulic jack are bracketed to the respective complemental sections of the telescoping frame.

In carrying out the principles of this invention manual effort is no longer needed to operate this power lift inasmuch as it may be operated directly from the source of hydraulic power on the tractor. In fact, the tractor has to be running to make the invention work and may be operated from the tractor seat by means of a finger tip hydraulic lever which, as is perhaps known, is standard equipment on tractors of all makes.

As will also be hereinafter evident, the invention, which may perhaps be described as an attachment for the presently existing sectional mechanical frame lift, is permanently mounted and saves not only time but minimizes hard labor in that the operator manifestly does not have to manually raise and lower the feeder every time he operates the sheller. Then too, experimental use has shown that it takes approximately ten minutes more-or-less to mount the attachment by simply bolting it to the existing or stock parts without requiring extensive alterations therein. It follows that this advance, added to exclusive features which already exist on corn shellers, contributes to the over-all effectiveness of the same and fulfills, it is believed, a long felt need in this line of endeavor.

With these and other objects in view which will appear as the description proceeds, the invention resides in the novel construction, combination and arrangement of components substantially as hereinafter described and more particularly defined in the subjoined claims, it being understood that minor changes in shape, size and rearrangement of parts may be resorted to in actual practice without departing from the spirit or scope of the claimed invention.

In the drawings, wherein like numerals are employed to designate like parts throughout the views.

Figure 1:
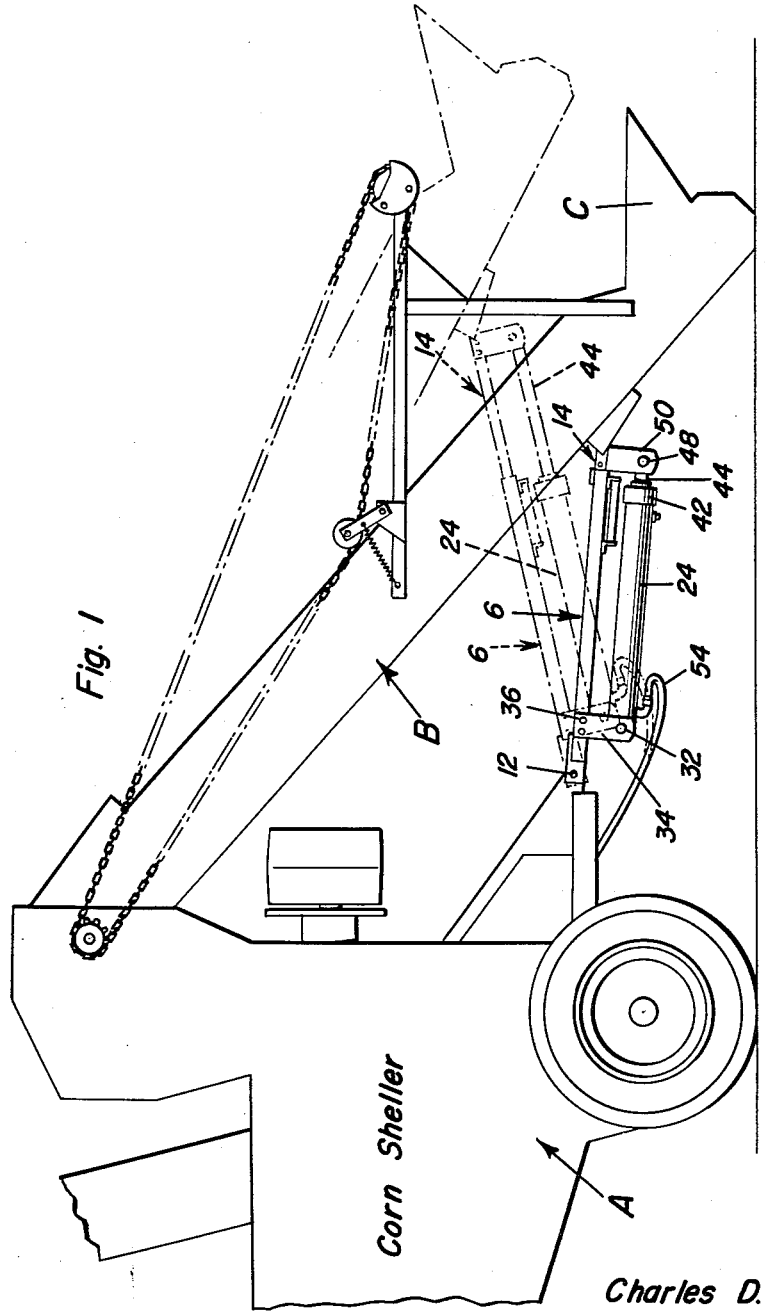
FIG. 1 is a view in side elevation showing a fragmentary portion of the aforementioned Minneapolis-Moline corn sheller and illustrating the up and down positions of the hopper-equipped feeder and also the corresponding full line and dotted line positions of the improved extensible and retractible frame means and the improved hydraulic jack or lift.
Figure 2:
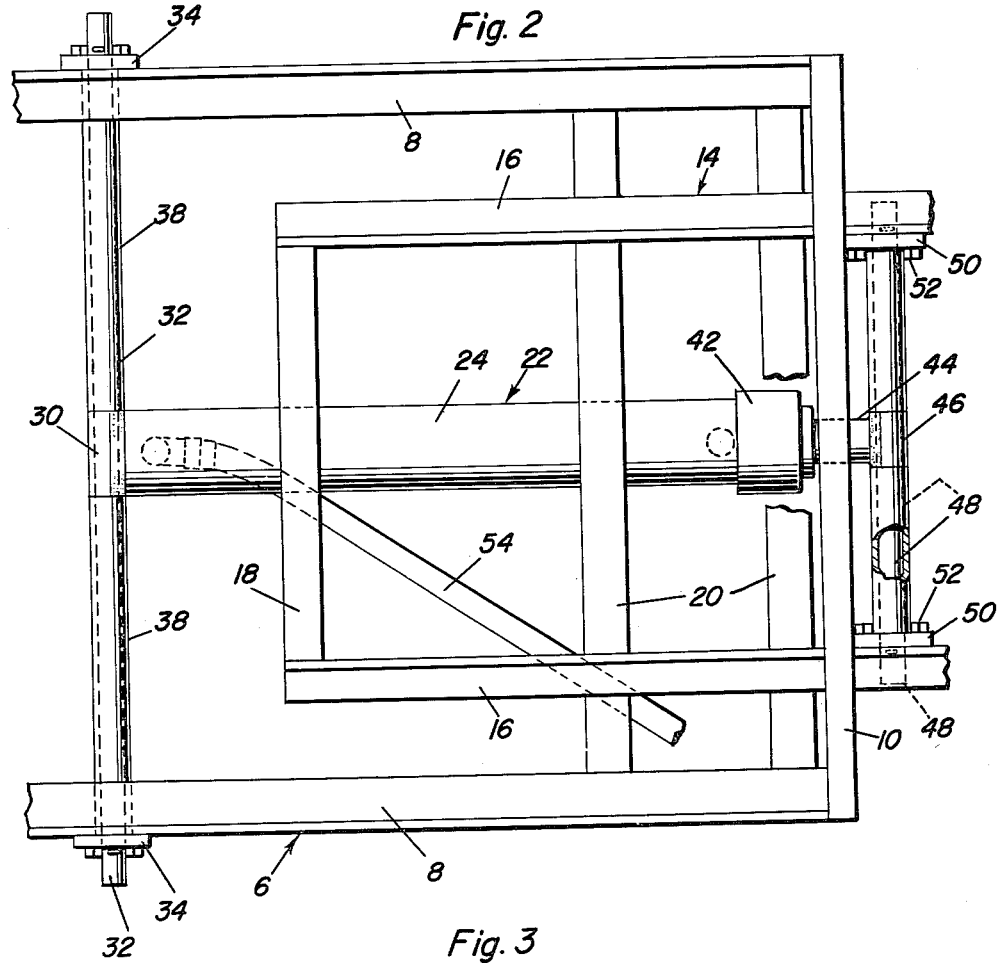
FIG. 2 is an enlarged plan view emphasizing the invention.
Figure 3:
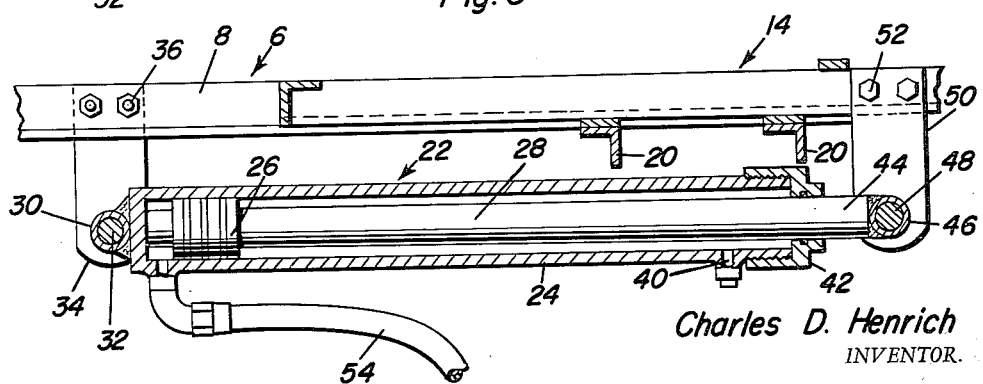
FIG. 3 is a view in section and elevation which shows further details in the construction and arrangement thereof.

With reference first to the general arrangement depicted in FIG. 1 the machine or corn sheller is denoted generally by the reference character A. The raisable and lowerable feeder is denoted at B and as stated, this normally rests on the ground as shown in full lines at which end there exists a suitable hopper C. The improved raising and lowering means comprises a telescoping-type extensible and retractible frame construction, or frame means broadly, which is best shown in FIG. 2. The large outer frame or frame section which may be called the left or forward frame (the feeder being on the rear of the machine) is denoted by the numeral 6. It embodies spaced parallel angle irons 8 connected together at their rearward ends by a transverse frame member 10. This frame section 6 is pivotally mounted, as at 12 (FIG. 1). The inner complemental frame section, also generally rectangular in plan, is denoted by the numeral 14 and comprises angle irons 16 connected together at the left hand end by a frame member 18. These frame sections are in the relationship shown in FIG. 3, suitable cross braces 20 being provided. The customarily employed steel cable operating through a series of pulleys and utilizing a hand turned crank is, of course, dispensed with here and the power lift or hydraulic jack is substituted as an attachment therefor. The jack is denoted generally by the numeral 22 and embodies a cylinder 24 with a piston or plunger 26 sliding therein and provided with a reciprocable rod 28. The closed left end of the cylinder has an integral pivoting member thereon which preferably constitutes a bearing sleeve 30. As shown in FIG. 2, this bearing sleeve is rockably mounted on a horizontally disposed shaft or rod 32 which, in turn, is mounted in holes provided therefor on a pair of cleat-like hanger brackets 34 having their upper ends bolted at 36 to the rails 8. The numeral 38 designates spacing sleeves. The right hand end of the cylinder is shown with an air vent 40 and a screw cap 42 through and beyond which the end portion 44 of the ram or rod extends. Here again, this rod terminates in a similar bearing sleeve 46 which is hingedly or pivotally mounted on a second rod or shaft 48 mounted in holes provided therefor in the depending hanger brackets 50 which are bolted at 52 to the rails 16 of the extensible and retractible frame section 14. Both of the shafts 32 and 48 are in longitudinal spaced apart parallel and coplanar relationship. The hydraulic fluid delivery hose or line is denoted at 54. Therefore, and as already explained, this improved hydraulic lift involves no manual labor and is operated directly from the hydraulic piston or jack attached to the hydraulic power of the tractor. The tractor has, obviously, to be running to make the device work and the up and down movements are operated from the tractor seat by means of a finger tip hydraulic lever (not shown) which as before explained is substantially standard on tractors. In FIG. 1, the full line position shows the feeder B down with the hopper C resting on the ground. When it is desired to transport the corn sheller or machine A to another place of operation the power jack is brought into play and the lengthwise extension of the same results in the frame sections being extended and consequently the feeder B lifted or lowered as the case may be.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use between a mobile corn sheller machine and a liftable and lowerable hopper-equipped feeder hingedly mounted on said machine; a mechanical lifting and lowering device for said feeder comprising, in combination, cooperating extensible and retractible frame sections providing a lifting and lowering frame for said feeder, power means for lifting and lowering the frame comprising a hydraulic cylinder parallel to and centrally beneath the sections of the frame, means pivotally mounting an end of the cylinder on one frame section, a piston reciprocable in the cylinder and having a push rod, and means pivotally connecting said rod with the other frame section, said first named means comprising a pair of attaching brackets attached to and depending from said one frame section, and a shaft carried by and spanning the space between the brackets, one end of said cylinder having a fixed rocker sleeve mounted for angular rotation on said shaft.

2. The structure defined in claim 1 and wherein said second-named means also comprises a pair of attaching brackets attached to and depending from said other frame section, an intervening shaft carried by and spanning the space between said brackets, and the end of said push rod adjacent to said last-named shaft having a fixed rocker sleeve mounted for angular rotation on said last-named shaft.

References Cited in the file of this patent

UNITED STATES PATENTS

| | | |
|---|---|---|
| 2,221,536 | Book et al. | Nov. 12, 1940 |
| 2,615,586 | Miller et al. | Oct. 28, 1952 |
| 2,732,087 | Pratt | Jan. 24, 1956 |
| 2,784,825 | Hansen | Mar. 12, 1957 |
| 2,784,855 | Acker | Mar. 12, 1957 |